(12) United States Patent  
Sumi

(10) Patent No.: US 9,442,324 B2  
(45) Date of Patent: Sep. 13, 2016

(54) ARRAY SUBSTRATE FOR LIQUID CRYSTAL DISPLAY DEVICE, AND MANUFACTURING METHOD THEREOF

(71) Applicant: Mitsubishi Electric Corporation, Tokyo (JP)

(72) Inventor: Akinori Sumi, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/714,018

(22) Filed: May 15, 2015

(65) Prior Publication Data

US 2015/0346558 A1  Dec. 3, 2015

(30) Foreign Application Priority Data

May 27, 2014  (JP) ................................. 2014-108837

(51) Int. Cl.
*G02F 1/1337* (2006.01)
*G02F 1/1362* (2006.01)

(52) U.S. Cl.
CPC ... *G02F 1/133784* (2013.01); *G02F 1/133707* (2013.01); *G02F 2001/136295* (2013.01); *G02F 2201/40* (2013.01)

(58) Field of Classification Search
CPC ................................................ G02F 1/133784
See application file for complete search history.

(56) References Cited

U.S. PATENT DOCUMENTS

| | | | | |
|---|---|---|---|---|
| 7,136,140 B1* | 11/2006 | Inoue | ................ | G02F 1/133707 349/130 |
| 7,248,329 B2* | 7/2007 | Park | .................... | G02F 1/13394 349/123 |
| 7,375,781 B2* | 5/2008 | Kubo | ................ | G02F 1/133555 349/114 |
| 8,842,250 B2* | 9/2014 | Iwamoto | ............. | G02F 1/13378 349/128 |
| 2009/0051862 A1* | 2/2009 | Ikebe | .................... | G02F 1/1337 349/123 |
| 2012/0133865 A1 | 5/2012 | Yonemura et al. | | |

FOREIGN PATENT DOCUMENTS

JP  2012-113125 A  6/2012

* cited by examiner

*Primary Examiner* — Timothy L Rude  
(74) *Attorney, Agent, or Firm* — Studebaker & Brackett PC

(57) ABSTRACT

A source line is provided on a layer above a substrate, and as a whole, extends in a first direction while meandering along the main surface of the substrate. An alignment film is provided on a layer above the source line, and specifies the alignment direction of a liquid crystal. A first protruding section along the source line is formed on the surface of the alignment film. In a cross-section that is parallel to the first direction and perpendicular to the substrate, and that passes through the source line, the inclination of an inclined end face on one side of the first protruding section in the first direction is steeper than the inclination of each inclined end face on the other side of the protruding section.

9 Claims, 8 Drawing Sheets

ARRAY SUBSTRATE FOR LIQUID CRYSTAL DISPLAY DEVICE, AND MANUFACTURING METHOD THEREOF

BACKGROUND OF THE INVENTION

1. Field of the Invention

The present invention relates to an array substrate for a liquid crystal display device, and a manufacturing method thereof.

2. Description of the Background Art

A liquid crystal display device includes an opposite substrate, a liquid crystal, and an array substrate. The liquid crystal is arranged between the opposite substrate and the array substrate, and display voltage is applied to the liquid crystal by the array substrate. The array substrate includes a plurality of gate lines and a plurality of source lines. The gate line and the source line intersect each other interposing an insulating layer therebetween. An alignment film is formed on the upper layer of the gate lines and the source lines, and this alignment film specifies the alignment state of the liquid crystal in a state where display voltage is not applied.

On the surface of the alignment film, a step that is dependent on the step of the layer below itself is formed, and a protruding section is formed at a part facing the source line, for example. Also, a rubbing process is performed on the alignment film at the time of manufacture. This rubbing process is performed by rubbing the surface of the alignment film with a cloth while a rubbing roller having this cloth attached to its surface is rolling.

A liquid crystal display device of a transverse electric field method, such as an In Plane Switching method or an FFS (Fringe Field Switching) method, for driving a liquid crystal by generating a transverse electric field substantially parallel to a substrate in the liquid crystal, sometimes adopts so-called multi-domain pixels. Such a multi-domain pixel has a bent shape, for example. More specifically, each pixel has a shape where two parallelograms are joined in a line-symmetric manner with respect to one side of the parallelogram, for example. According to such a multi-domain pixel, two domains divided by this one side have the liquid crystals aligned in different directions to each other. The viewing angle may thereby be widened.

Also, since a pair of sides of each pixel is bent, the source line along the sides also extends while being bent (that is, in a meandering manner).

Now, as described above, a protruding section caused by the source line is formed on the surface of the alignment film. Accordingly, this protruding section also extends while being bent according to the pattern of the source line. When performing the rubbing process on such an alignment film, the inclined end face, of inclined end faces forming the protruding section of the alignment film, on the downstream side in the rubbing direction does not easily come in contact with the rubbing roller. This will be described in detail with respect to an embodiment.

When the rubbing process is insufficient on this inclined end face, the alignment state of the liquid crystal corresponding to the inclined end face is not made a desirable alignment state. This leads to reduction in the display performance (light leakage, reduced contrast, and the like).

To solve this problem, according to Japanese Patent Application Laid-Open No. 2012-113125, a light-shielding layer (black matrix) having an enough width for covering the protruding section of the alignment film is provided. Then, even if there is a region in the protruding section of the alignment film where the rubbing process is insufficient, the light passing through the region is blocked by the light-shielding layer. Accordingly, reduction in the display performance that is caused by alignment abnormality may be prevented. However, an increase in the width of the light-shielding layer leads to reduction in the aperture ratio and sacrifices the luminance characteristic.

SUMMARY OF THE INVENTION

The object is to provide an array substrate on which the rubbing process is easily performed while suppressing a reduction in the aperture ratio.

An array substrate for a liquid crystal display device sandwiches a liquid crystal with an opposite substrate. The array substrate for a liquid crystal display device includes a substrate, a first line, and an alignment film. The first line is provided on a layer above the substrate, and as a whole, extends in a first direction while meandering along the main surface of the substrate. The alignment film is provided on a layer above the first line, and specifies the alignment direction of the liquid crystal. The surface of the alignment film includes a first protruding section protruding in the normal direction of the main surface. The first protruding section meanders and extends along the first line. The first protruding section appears as a plurality of first cross-sectional protruding sections in a cross-section that passes through the first line, that is parallel to the first direction and that is perpendicular to the substrate. Each of the plurality of first cross-sectional protruding sections includes a first end face on one side in the first direction, and a second end face on the other side. The inclination of the first end face is steeper than the inclination of the second end face.

A manufacturing method of an array substrate for a liquid crystal display device includes first to fourth steps, the array substrate sandwiching a liquid crystal with an opposite substrate. In the first step, a first line that extends in a first direction while meandering along the main surface of a substrate is provided. In a second step, a protruding section formation aiding section that forms a first protruding section together with the first line is provided. The protruding section formation aiding section is adjacent to the first line in the normal direction of the substrate, and meanders and extends along the first line in plan view. The first protruding section includes a width along the first direction is narrowed in a stepwise manner as the distance from the substrate is increased, in a cross-section that is parallel to the first direction and is perpendicular to the substrate and passes through the first line. The first protruding section appears as a plurality of first cross-sectional protruding sections in the cross-section. The distance of a stepwise inclination on one side in the first direction is greater than the distance of a stepwise inclination on the other side in the first direction for each of the plurality of first cross-sectional protruding sections. In the third step, an alignment film before rubbing process is provided on a layer above the first line and the protruding section formation aiding section. In the fourth step, the rubbing process is performed on the alignment film before rubbing process by moving a rubbing roller from the other side in the first direction to the one side.

According to the array substrate for a liquid crystal display device of the present invention and the manufacturing method thereof, the rubbing process is performed from the steeper side of the inclined end faces, and thus the rubbing process is easily performed on the alignment film. Moreover, reduction in the aperture ratio may be suppressed.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

<Liquid Crystal Display Device>

Figure 1:
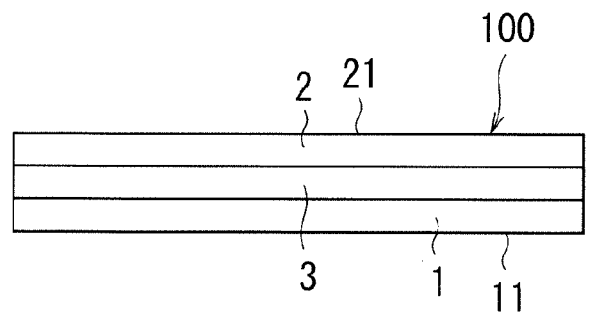
FIG. 1 is a cross-sectional view conceptually illustrating an example of the structure of a liquid crystal display device.

FIG. 1 illustrates an example of a conceptual structure of a liquid crystal display device 100 including an array substrate 1 of a first embodiment. The liquid crystal display device 100 includes the array substrate 1, an opposite substrate 2, and a liquid crystal 3. The array substrate 1 sandwiches the liquid crystal 3 with the opposite substrate 2, and forms the liquid crystal display device 100. The array substrate 1 has a structure (described later) for applying display voltage to the liquid crystal 3 on a per pixel basis. A color filter is provided to the opposite substrate 2 on a per pixel basis, for example.

Display voltage is applied to the liquid crystal 3 on a per pixel basis, and the alignment state thereof is controlled. Light from a backlight, not illustrated, is transmitted through the liquid crystal display device 100. The polarization state of light that is transmitted through the liquid crystal 3 changes depending on the alignment state of the liquid crystal 3. Polarization layers 11 and 21 are provided to the array substrate 1 and the opposite substrate 2, respectively, thereby light of an intensity according to the alignment state passes through the liquid crystal display device 100 on a per pixel basis. The liquid crystal display device 100 is thereby enabled to display an image.

<Array Substrate>

Figure 2:
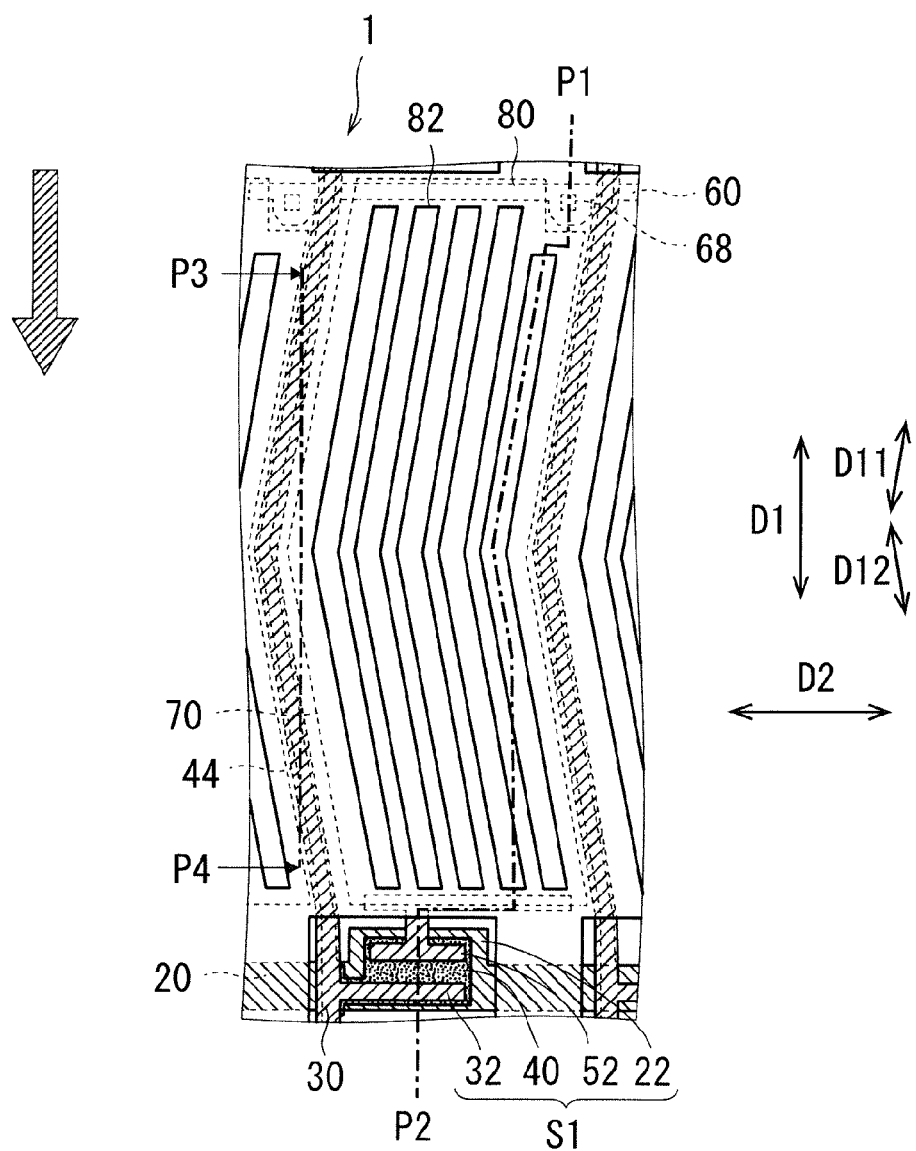
FIGS. 2 and 3 are plan views each conceptually illustrating an example of a part of an array substrate of the liquid crystal display device.
Figure 3:
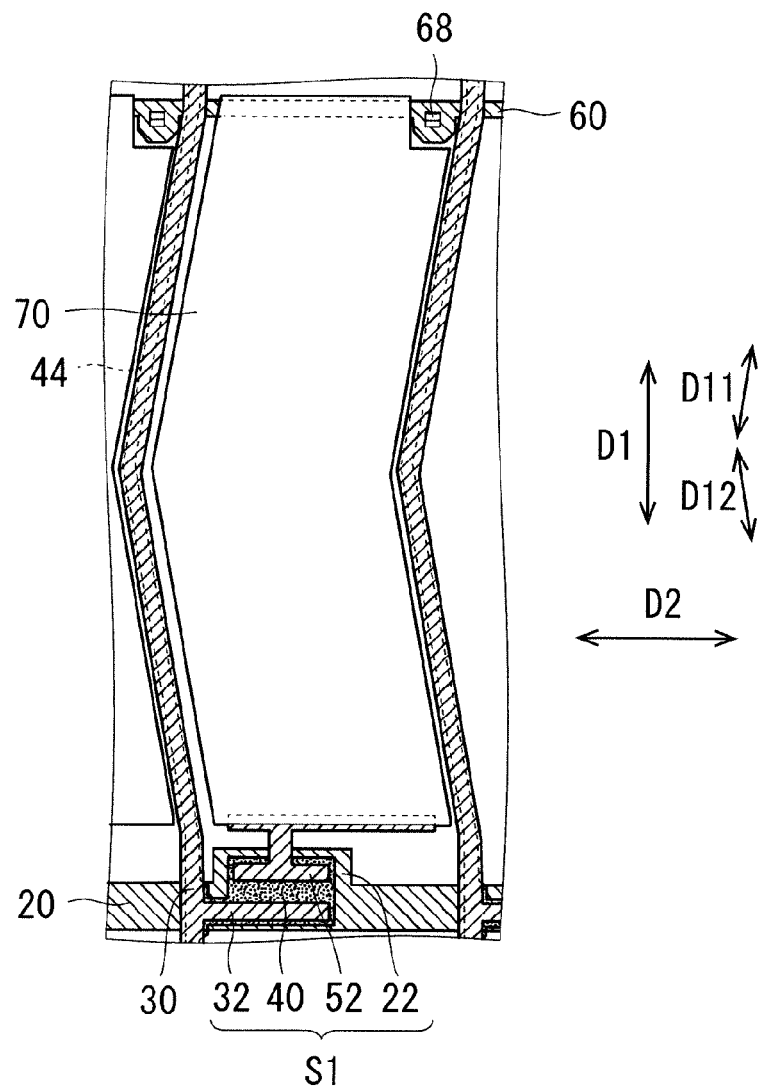
Figure 4:
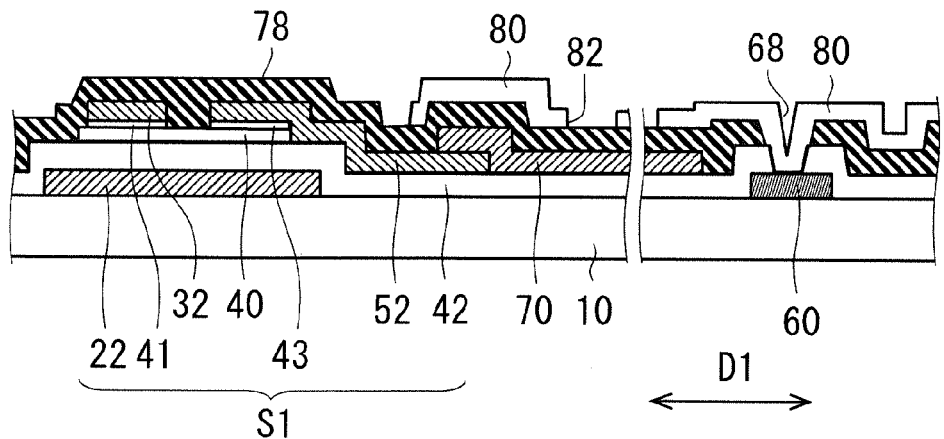
FIGS. 4 and 5 are cross-sectional views each conceptually illustrating an example of a part of the array substrate.

FIG. 2 is a plan view conceptually illustrating a part of the array substrate 1 corresponding to one pixel, and FIG. 3 is a view from which a common electrode 80 (described later) is provided to the array substrate 1 is omitted. FIG. 4 is a cross-sectional view along a cross-section line P1-P2 in FIG. 2.

Additionally, the array substrate 1 may be applied to a liquid crystal display device of an arbitrary transverse electric field method, for example. In the present first embodiment, description is given on application to a liquid crystal display device of an FFS method allowing an increase in the transmittance, which is as an example of a liquid crystal display device of a transverse electric field method.

The array substrate 1 has a transparent substrate (for example, a glass substrate) 10, and a multi-layer film is provided on the main surface of the substrate 10 (the main surface on the side of the liquid crystal 3). This multi-layer film is formed by each structure described later, for example.

The multi-layer film provided to the array substrate 1 includes a gate line 20, a source line 30, and a common line 60. In the example illustrated in FIGS. 2 and 3, the gate line 20 extends along a transverse direction D2. A plurality of gate lines 20 are provided, and these are provided in a longitudinal direction D1 with gaps therebetween. The plurality of gate lines 20 extend in parallel with one another. The common line 60 is formed, for example, on the same layer as the gate line 20 and in parallel to the gate line 20. The common line 60 serves the role of supplying reference potential to the common electrode 80 (described later). The gate line 20 and the common line 60 may be formed of a metal such as Al, Cr, Mo, Ti, Ta, W, Ni, Cu, Au, Ag, or the like, a single layer film of an alloy of these metals, or a stacked-layer film of these metals, for example. The source line 30 is arranged so as to intersect with the gate line 20. A gate insulating film 42 described later is formed between the source line 30 and the gate line 20, and between the source line 30 and the common line 60. As a whole, the source line 30 extends in the longitudinal direction D1 in a meandering manner. In the example illustrated in FIGS. 2 and 3, the source line 30 is bent substantially in the middle of one pixel, and meanders along the longitudinal direction D1 with respect to the whole of the array substrate 1. A plurality of source lines 30 are provided, and these are provided in the transverse direction D2 with gaps therebetween. The plurality of source lines 30 extend in parallel with one another. The source line 30 may be formed of a metal such as Al, Cr, Mo, Ti, Ta, W, Ni, Cu, Au, Ag or the like, a single layer film of an alloy of these metals, or a stacked-layer film of these metals, for example.

For example, the source line 30 is bent in the middle of one pixel in the longitudinal direction D1. More specifically, for example, as the source line 30 gets farther away from a position close the a switching element S1 toward one side (upper side on the page) in the longitudinal direction D1, the source line 30 extends along a second inclination direction D12, bends in the middle of the pixel in the longitudinal direction D1, and then extends along a first inclination direction D11. The second inclination direction D12 (the inclination is shown as an upper left to lower right direction on the page) is inclined with respect to the longitudinal direction D1. The first inclination direction D11 is inclined (the inclination is shown as an upper right to lower left direction on the page) to the opposite side from the second inclination direction D12 with respect to the longitudinal direction D1.

Regions surrounded by respective gate lines 20 and respective source lines 30 correspond to pixels, and a plurality of pixels are arranged in an array on the entire array substrate 1.

The switching element (for example, a TFT: Thin Film Transistor) S1 is provided at the intersection of the gate line 20 and the source line 30. The switching element S1 includes a gate electrode 22, a source electrode 32, a drain electrode 52, a gate insulating film 42, a semiconductor film 40, ohmic contact layers 41 and 43, and the like.

The gate electrode 22 is a part of the gate line 20, and its width along the longitudinal direction D1 is formed to be wider than the width of the gate line 20. The gate insulating film 42 is provided on the gate line 20, the gate electrode 22, and the common line 60. The gate insulating film 42 is made of an oxide film, a nitride film, or the like, for example. The semiconductor film 40 is provided on the gate insulating film 42, at a region facing at least a part of the gate electrode 22. The ohmic contact layers 41 and 43 are provided on the semiconductor film 40, at regions facing at least the gate electrode 22, and these are separated from each other in the longitudinal direction D1. The ohmic contact layers 41 and 43 are formed in the following manner, for example. First, a semiconductor layer for forming the semiconductor film 40 is formed, and an impurity is injected at a top portion of the semiconductor layer. Then, a part of this top portion is removed. The parts separated by this part are made the ohmic contact layers 41 and 43, respectively. Also, of the semiconductor layer, the parts covered by the ohmic contact layers 41 and 43 (on the side of the substrate 10) are made the semiconductor film 40, and the part that is exposed between the ohmic contact layers 41 and 43 is made a channel section of the semiconductor film 40.

The source electrode 32 is branched from the source line 30 to extend along the transverse direction D2, and is provided on the ohmic contact layer 41. The drain electrode 52 is provided on the ohmic contact layer 43.

A pixel electrode 70 is provided on the drain electrode 52. The pixel electrode 70 is an electrode having a plate shape (planar shape) for applying display voltage to the liquid crystal 3, and is provided for each pixel. More specifically, the pixel electrode 70 is provided in a pixel region that is surrounded by the gate lines 20 and the source lines 30. The pixel electrode 70 is made of a transparent conductive film such as an ITO (Indium Tin Oxide) or IZO (Indium Zinc Oxide) film. In the example illustrated in FIG. 2, the pixel electrode 70 has a bent shape in accordance with the bent shape of the source line 30. Here, the pixel electrode 70 has a shape where two parallelograms are joined while being line-symmetric with respect to one side thereof.

Additionally, the pixel electrode 70 does not necessarily have to be formed directly on the drain electrode 52. For example, it may be electrically connected to the drain electrode 52 through a contact hole provided to an insulating film (not shown). The pixel electrode 70 may alternatively be formed on a layer below the drain electrode 52. For example, the pixel electrode 70 may be formed in the same layer as the semiconductor layer, and the drain electrode 52 may be formed on the semiconductor film 40 and the pixel electrode 70.

An interlayer insulating film 78 is provided on the switching element S1 and the pixel electrode 70. The interlayer insulating film 78 is made of a single layer film which is an insulating film such as an oxide film, a nitride film or the like, or a stacked-layer film of these films.

The common electrode 80 is provided on the interlayer insulating film 78 at other than the region facing the switching element S1, for example. The common electrode 80 is made of a transparent conductive film of ITO or IZO, for example, and is connected to the common line 60 through a contact hole 68. Common potential is applied to the common electrode 80 via the common line 60.

A plurality of slits 82 are provided to the common electrode 80, in a region facing the pixel electrode 70. As a whole, the slit 82 extends in the longitudinal direction D1, and as with the source line 30, it extends while being bent. The plurality of slits 82 are arranged in the transverse direction D2 with gaps therebetween.

An alignment film (not illustrated) is provided on the multi-layer film including the gate line 20, the source line 30, the switching element S1, the pixel electrode 70, the interlayer insulating film 78, and the common electrode 80. This alignment film specifies the alignment direction of the liquid crystal 3 in a state where display voltage is not applied.

In the liquid crystal display device 100 as described above, a gate signal (a drive signal) is applied to the gate line 20 so that the switching element S1 connected to the gate line 20 is turned on, and a source signal (display voltage) is applied to the source line 30 so that display voltage is applied to the pixel electrode 70 via the switching element S1 which has been turned on.

When display voltage is applied, a fringe electric field is applied to the liquid crystal 3 by the pixel electrode 70 and the common electrode 80. More specifically, a line of electric force from the pixel electrode 70 passes the inside of the liquid crystal 3 through the slit 82, is turned inside the liquid crystal 3, and reaches the common electrode 80. The alignment direction of the liquid crystal 3 is changed according to such a fringe electric field. The size of the fringe electric field is dependent on the size of display voltage that is applied to the pixel electrode 70, and thus the alignment direction of the liquid crystal 3 may be controlled by the display voltage.

Moreover, in the example illustrated in FIG. 2, the slit 82 is bent. Accordingly, the direction of the fringe electric field is, in plan view, different between the upper portion and the lower portion of the pixel separated by the bent portion as the boundary. For example, in the upper portion of the pixel, the fringe electric field is along the upper left to lower right direction in plan view, and in the lower portion of the pixel, the fringe electric field is along the upper right to lower left direction in plan view. Accordingly, the alignment direction of the liquid crystal 3 is different between the upper portion and the lower portion of the pixel. The viewing angle may thus be widened, and color shift may be suppressed. The liquid crystal display device 100 as described above is sometimes referred to as a multi-domain liquid crystal display device.

Additionally, the common electrode 80 desirably covers (faces) the gate line 20 (excluding the gate electrode 22), the source line 30, and the common line 60. Leakage electric field to the liquid crystal 3 from the gate line 20, the source line 30, and the common line 60 may then be blocked. Accordingly, display defect caused by leakage electric field may be suppressed.

Figure 5:
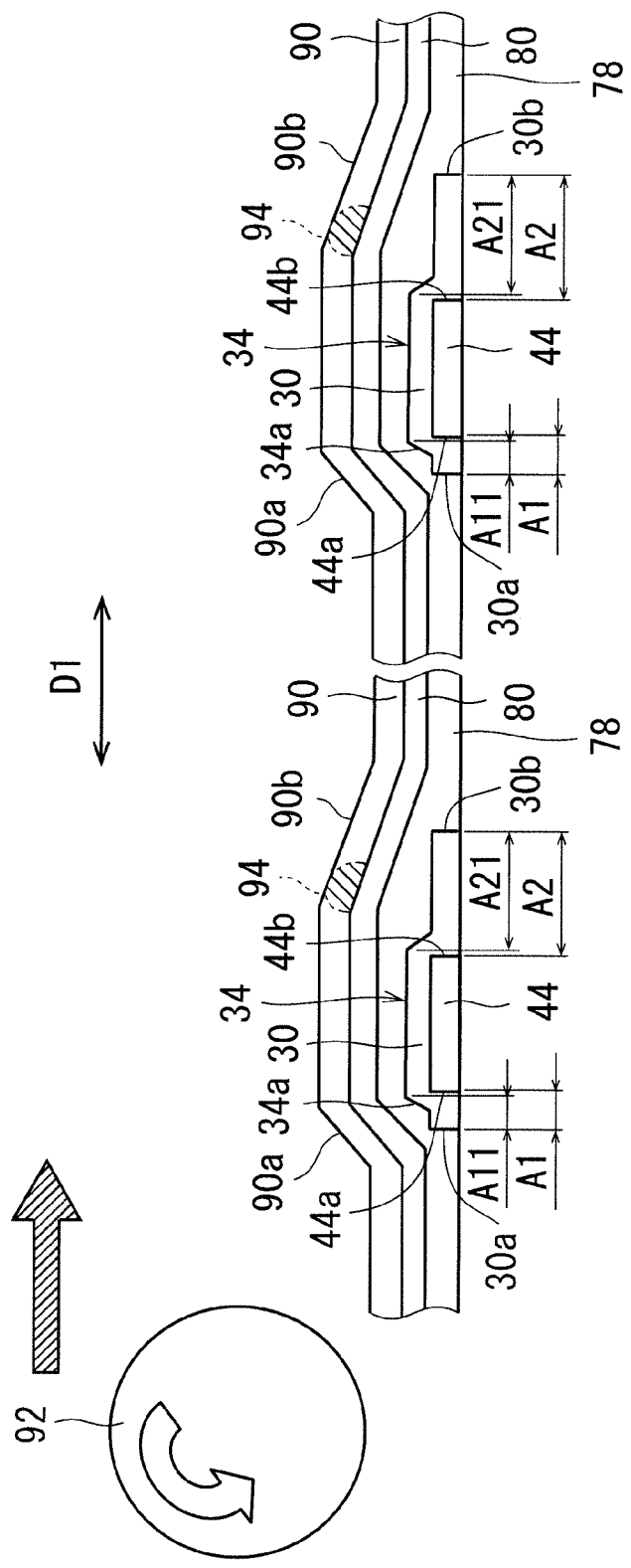

Next, the structure provided immediately below the source line 30 will be described. FIG. 5 illustrates a cross-sectional view along a cross-section line P3-P4 in FIG. 2. That is, a cross-sectional view that is parallel to the longitudinal direction D1, that is perpendicular to the substrate 10, and that passes through the source line 30 is illustrated. In FIG. 5, the left side on the page corresponds to the upper side on the page in FIG. 2, and the right side on the page corresponds to the lower side on the page in FIG. 2. Additionally, in FIG. 5, the structure of layers below the source line 30 is omitted.

As illustrated in FIG. 5, a semiconductor layer 44 is provided immediately below the source line 30. This semiconductor layer 44 is formed by the same step as the semiconductor layer for forming the semiconductor film 40 and the ohmic contact layers 41 and 43, for example. That is, at the time of manufacture, a semiconductor layer is stacked on the substrate 10, and an impurity is formed on the top portion of the semiconductor layer and is then etched, and the semiconductor layer 44 and a semiconductor layer for forming the semiconductor film 40 and the ohmic contact layers 41 and 43 may thereby be obtained. For example, the semiconductor layer 44 has the same composition as the semiconductor film 40 at its lower portion, and has the same composition as the ohmic contact layers 41 and 43 at its upper portion.

Next, a metal film for forming the source line 30 and the source electrode 32 is stacked and etched, thereby the source line 30 and the source electrode 32 are formed. Here, the semiconductor layer 44 and the semiconductor film 40 are joined. The source line 30 and the source electrode 32 are continuously extended over the semiconductor layer 44 and the semiconductor film 40.

Now, the semiconductor film 40 is provided on the gate electrode 22 and the gate insulating film 42, and the semiconductor layer 44 is provided at a position where the gate electrode 22 is not present. Accordingly, a step is formed between semiconductor layer 44 and the semiconductor film 40. Thus, a step is also formed between the source line 30 and the source electrode 32 formed on the upper layer. However, the height of the source line 30 is increased by the semiconductor layer 44, and the height of the step may be reduced compared to a case where the semiconductor layer 44 is not provided. Thus, occurrence of disconnection may be suppressed.

The semiconductor layer 44 extends along the source line 30, but its width is narrower than the source line 30. In the example illustrated in FIGS. 2, 3 and 5, the source line 30 spreads out from the semiconductor layer 44 on both sides. In the example illustrated in FIG. 5, an end face 30a of the source line 30 on the upper side in the longitudinal direction (left side on the page) is positioned on the upper side in the longitudinal direction than an end face 44a of the semiconductor layer 44 on the upper side in the longitudinal direction, and an end face 30b of the source line 30 on the lower side in the longitudinal direction (right side on the page) is positioned on the lower side in the longitudinal direction than an end face 44b of the semiconductor layer 44 on the lower side in the longitudinal direction. In other words, the semiconductor layer 44 is covered by the source line 30. Accordingly, the center portion of the source line 30 is raised than both end portions of the source line 30 by the thickness of the semiconductor layer 44. In this manner, the source line 30 and the semiconductor layer 44 together form a protruding section 34. The distance of the protruding section 34 along the longitudinal direction D1 is decreased stepwise as the distance from the substrate 10 is increased, and more specifically, the protruding section 34 is a protruding section having a substantially pyramid shape with two stages. The thickness of a set of the semiconductor layer 44 and the source line 30 is about several hundreds of nanometers, for example.

Also, as illustrated in FIG. 5, in the present embodiment, a distance A2 between the end faces 44b and 30b is greater than a distance A1 between the end faces 30a and 44a. In other words, a distance A21, along the longitudinal direction D1, of the stepwise inclination on the lower side of the protruding section 34 in the longitudinal direction is greater than a distance A11, along the longitudinal direction D1, of the stepwise inclination on the upper side of the protruding section 34. That is, the semiconductor layer 44 is arranged more to the upper side in the longitudinal direction with respect to the source line 30. For example, the distances A1 and A2 are 8.5 (μm) and 13.5 (μm), respectively.

Protruding sections reflecting the shape of the source line 30 (the protruding section 34) are formed on the surfaces of the interlayer insulating film 78, the common electrode 80, and the alignment film 90 formed on the source line 30. Since the distance A2 is greater than the distance A1, the inclined end faces of these protruding sections on the lower side in the longitudinal direction are gentler than the inclined end faces on the upper side in the longitudinal direction in the cross-section in FIG. 5.

Additionally, since the source line 30 and the semiconductor layer 44 meander, in the cross-section along the cross-section line P3-P4, a plurality of protruding sections (corresponding to cross-sectional protruding sections) 34 appear along the longitudinal direction D1, and a plurality of protruding sections of the alignment film 90 also appear along the longitudinal direction D1, as illustrated in FIG. 5. Moreover, at each of the plurality of protruding sections 34, the distance A2 (A21) is greater than the distance A1 (A11), and at each of the plurality of protruding sections of the alignment film 90, an inclined end face 90b is gentler than an inclined end face 90a.

<Rubbing Process>

According to the array substrate 1 as described above, the rubbing process is easily performed on the alignment film 90. This will be described below.

A rubbing roller 92 for performing the rubbing process on the alignment film 90 is also illustrated in FIG. 5. A cloth is wrapped around the surface of the rubbing roller 92. The rubbing roller 92 is rolled and moved on the alignment film 90 while being pressed against the alignment film 90 at a predetermined pressure. In a liquid crystal display device of the transverse electric field, the rubbing roller 92 basically moves along the lengthwise direction (the longitudinal direction D1) of the source line 30. In FIGS. 2 and 5, the movement direction of the rubbing roller 92 is illustrated with a hatched block arrow. The rubbing roller 92 moves from the upper side in the longitudinal direction to the lower side in the longitudinal direction in FIG. 2 (from the left side on the page to the right side on the page in FIG. 5). The rotation direction of the rubbing roller 92 is shown by an outlined block arrow in FIG. 5, and the rubbing roller 92 is rotated in the direction of increasing the friction with the alignment film 90.

When the rubbing roller 92 moves from the upper side in the longitudinal direction to the lower side in the longitudinal direction while rotating, the rubbing roller 92 first abuts the protruding section of the alignment film 90 from the upper side in the longitudinal direction. The inclination of the inclined end face 90a on the upper side in the longitudinal direction of the protruding section of the alignment film 90 is relatively steep, but since the inclined end face 90a faces against the movement direction of the rubbing roller 92, the rubbing roller 92 may apply sufficient pressure on the inclined end face 90a. Thus, the rubbing process may be sufficiently performed on the inclined end face 90a on the upper side in the longitudinal direction.

Then, after passing the inclined end face 90a, the rubbing roller 92 moves on the flat portion of the protruding section. Subsequently, the rubbing roller 92 reaches the inclined end face 90b on the lower side in the longitudinal direction. The inclined end face 90b is inclined to be separated away from the rubbing roller 92 from the upper side in the longitudinal direction to the lower side in the longitudinal direction. Accordingly, it is more difficult for the rubbing roller 92 to follow the surface (the inclined end face 90*b*) of the alignment film 90 when the inclination of the inclined end face 90*b* is made steeper. More specifically, the pressure from the rubbing roller 92 on the alignment film 90 may be reduced at the inclined end face 90*b*. That is, the rubbing process is difficult to be performed on the inclined end face 90*b*, and the rubbing process may become insufficient.

However, in the present first embodiment, the inclination of the inclined end face 90*b* is gentler than the inclination of the inclined end face 90*a*, and thus the rubbing roller 92 may easily follow the surface of the alignment film 90 at the inclined end face 90*b*. In other words, the rubbing roller 92 may be pressed against the inclined end face 90*b* with a relatively appropriate pressure. Thus, the rubbing process may be performed relatively appropriately also on the inclined end face 90*b* on the lower side in the longitudinal direction.

As described above, in the above example, the shape of the protruding section formed to the alignment film 90 is made a shape where the rubbing process is easily performed, based on the shapes of the protruding sections of a set of the source line 30 and the semiconductor layer 44. That is, the inclination of the inclined end face 90*b* on the downstream (on the lower side in the longitudinal direction in this case) of movement of the rubbing roller 92 is made gentler than the inclination of the inclined end face 90*a* on the upstream (on the upper side in the longitudinal direction in this case).

<Positional Relationship Between Inclined End Face of Protruding Section of Alignment Film and Source Line>

Next, a portion of the inclined end face 90*b* where the pressure of the rubbing roller 92 tends to be reduced will be described. Specifically, the pressure tends to be reduced at a portion 94, of the inclined end face 90*b*, on the upper side in the longitudinal direction. This is because when the rubbing roller 92 approaches the inclined end face 90*b* from a flat portion while moving on the flat portion at a constant pressure, the pressure is reduced with the same pressing force.

In plan view, the source line 30 faces the inclined end face 90*b* at a wider range than the portion 94 as the distance A2 is increased. That is, by increasing the distance A2, the portion 94 may be covered by the source line 30 in plan view from the substrate 10 side. Accordingly, even if the level of the rubbing process at the portion 94 is lower compared to other portions, the light is blocked at the liquid crystal 3 corresponding to the portion 94 by the source line 30. Thus, since the light from the backlight does not pass through this portion, reduction in the display performance due to the portion 94 is not caused.

<Positional Relationship Between Source Line and Semiconductor Layer in Transverse Direction D2>

Figure 6:
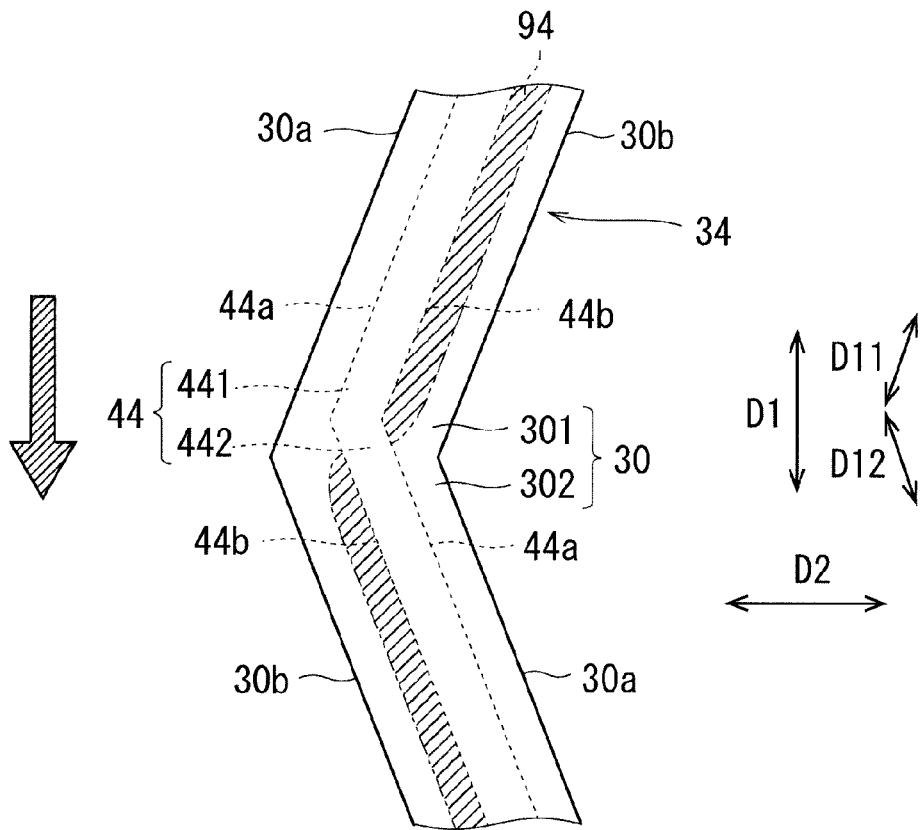
FIG. 6 is a plan view conceptually illustrating an example of a part of the array substrate.

The source line 30 extends in one direction while meandering, for example. In FIG. 2, the source line 30 meanders along the longitudinal direction D1 while being bent, for example. In the example illustrated in FIG. 2, the source line 30 linearly extends along the upper right to lower left direction on the upper side of the bent portion in the longitudinal direction, and linearly extends along the upper left to lower right direction on the lower side of the bent portion (on the lower side of the pixel) in the longitudinal direction. Thus, as illustrated in FIG. 6, on the upper side of the bent portion in the longitudinal direction, the end face of the source line 30 on the left side on the page corresponds to the end face 30*a* on the upper side in the longitudinal direction, and the end face on the right side on the page corresponds to the end face 30*b* on the lower side in the longitudinal direction. On the other hand, on the lower side of the bent portion in the longitudinal direction, the end face of the source line 30 on the right side on the page corresponds to the end face 30*a* on the upper side in the longitudinal direction, and the end face on the left side on the page corresponds to the end face 30*b* on the lower side in the longitudinal direction.

As described above, in the example illustrated in FIG. 6, the semiconductor layer 44 is provided more on the left side on the page with respect to the source line 30 on the upper side of the bent portion in the longitudinal direction, and more on the right side on the page with respect to the source line 30 on the lower side of the bent portion in the longitudinal direction. That is, the positional relation of the semiconductor layer 44 to the source line 30 in the transverse direction D2 is opposite between the upper side of the bent portion in the longitudinal direction and the lower side in the longitudinal direction. Accordingly, the distance A2 between the end faces 44*b* and 30*b* is greater than the distance A1 between the end faces 30*a* and 44*a* regardless of whether the position is on the upper side of the bent portion in the longitudinal direction or on the lower side in the longitudinal direction.

Accordingly, the inclination of the inclined end face 90*b* of the alignment film 90 is gentler compared to the inclination of the inclined end face 90*a* regardless of whether the position is on the upper side of the bent portion in the longitudinal direction or on the lower side in the longitudinal direction.

Moreover, in the example illustrated in FIG. 6, the position of the portion 94 is schematically indicated by diagonal hatching. According to FIG. 6, the portion 94 is, in plan view, in a region where the source line 30 is present. Thus, the light at the portion 94 is blocked by the source line 30. Accordingly, even if the level of the rubbing process at the portion 94 is low compared to other portions, this does not cause display abnormality.

Figure 7:
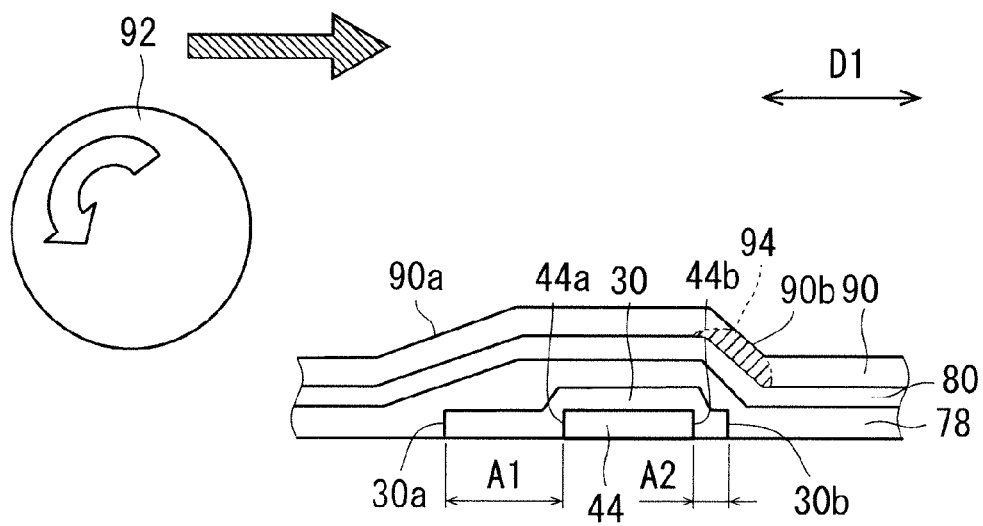
FIG. 7 is a cross-sectional view conceptually illustrating a part of an array substrate according to a comparative example.
Figure 8:
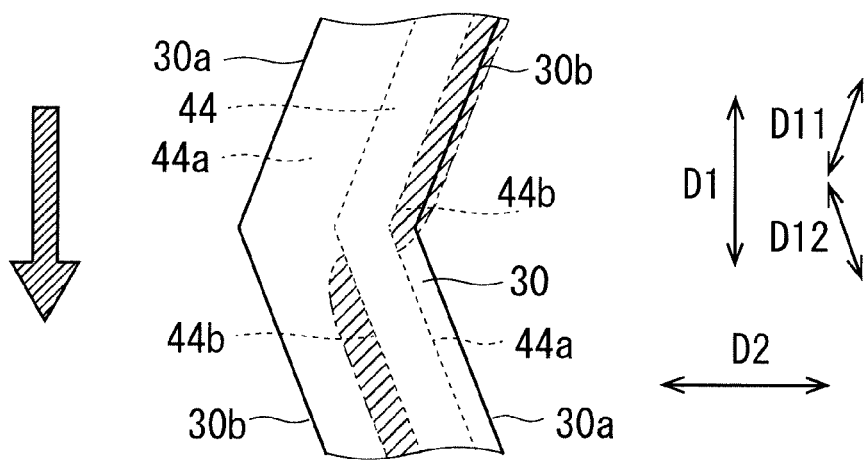
FIG. 8 is a plan view conceptually illustrating a part of the array substrate according to the comparative example.

A comparative example is illustrated in FIGS. 7 and 8. FIG. 7 is a cross-sectional view conceptually illustrating another example of the structure of the array substrate 1, and FIG. 8 is a plan view conceptually illustrating an example of the source line 30 and the semiconductor layer 44 of the array substrate 1 in FIG. 7. In the example illustrated in FIG. 8, the semiconductor layer 44 is arranged more on the right side with respect to the source line 30 regardless of whether the position is on the upper side of the bent portion in the longitudinal direction or on the lower side in the longitudinal direction. FIG. 7 illustrates a cross-section on the upper side of the bent portion in the longitudinal direction, and the distance A2 is shorter than the distance A1. In this case, the inclined end face 90*b* on the lower side in the longitudinal direction is steep, and thus the pressure of the rubbing roller 92 tends to be reduced. That is, the amount of reduced pressure is great, and the rubbing process becomes insufficient. Also, the portion 94 is widened. For example, the pressure of the rubbing roller 92 tends to be reduced on the entire inclined end face 90*b*. In the example illustrated in FIGS. 7 and 8, a part of the portion 94 spreads out from the source line 30 in plan view. Thus, the display performance may be reduced.

Additionally, in contrast to the present first embodiment, a structure where inclinations of both the inclined end faces 90*a* and 90*b* are made gentle is conceivable. However, the area (aperture ratio) of the pixel region (pixel electrode 70) is reduced as the width of the source line 30 is increased. On the other hand, according to the present first embodiment, the inclined end face 90*b* where the pressure of the rubbing roller 92 tends to be reduced is made gentle compared to the inclined end face 90*a* where the pressure of the rubbing roller 92 is not easily reduced. Accordingly, when using the technique of the present first embodiment, the rubbing process may be appropriately performed, and also, compared to the structure described above, the width of the source line 30 on the side of the inclined end face 90*a* may be made narrow, and thus the area of the pixel region may be increased.

In the example illustrated in FIG. 6, the source line 30 includes a portion 301 that extends along the first inclination direction D11, and a portion 302 that extends along the second inclination direction D12, and both the portions 301 and 302 extend linearly. Also, the portions 301 and 302 are joined with the same width (width along the transverse direction D2), and form an angle (bent portion).

The semiconductor layer 44 also includes a portion 441 that extends along the first inclination direction D11, and a portion 442 that extends along the second inclination direction D12, and both the portions 441 and 442 extend linearly. Also, the portions 441 and 442 are joined with the same width (width along the transverse direction D2), and form an angle (bent portion).

However, the width of the semiconductor layer 44 along the transverse direction D2 is narrower than the width of the source line 30, and the source line 30 covers the semiconductor layer 44. In short, the source line 30 and the semiconductor layer 44 extend with the same pattern and with different widths.

Also, the semiconductor layer 44 with a narrow width is shifted upper in the longitudinal direction than the source line 30 with a wide width. Specifically, the semiconductor layer 44 is, on the whole, shifted upper in the longitudinal direction than the source line 30.

Thus, the bent portion joining the portions 301 and 302 may be made to have the same width as the portions 301 and 302, and the bent portion joining the portions 441 and 442 may be made to have the same width as the portions 441 and 442, and occurrence of disconnection may be suppressed. Additionally, from the standpoint of suppressing disconnection at the bent portion, the width of the source line 30 at the bent portion may be wider than the width of other portions, for example. The same thing may be said for the semiconductor layer 44.

<Wide/Narrow Relationship of Widths of Source Line and Semiconductor Layer>

Figure 9:
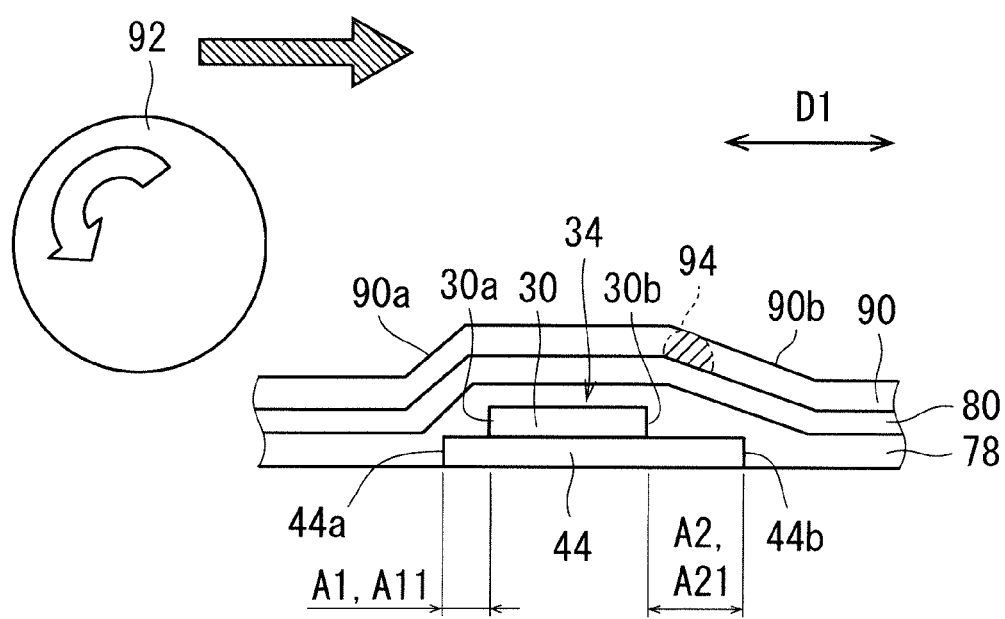
FIG. 9 is a cross-sectional view conceptually illustrating another example of a part of the array substrate.

In the example described above, the width of the semiconductor layer 44 is narrower than the width of the source line 30. However, this is not necessary for the present array substrate 1. For example, as illustrated in FIG. 9, the width of the semiconductor layer 44 may be wider than the width of the source line 30. In the example illustrated in FIG. 9, the end face 30*a* of the source line 30 on the upper side in the longitudinal direction is positioned on the lower side in the longitudinal direction than the end face 44*a* of the semiconductor layer 44 on the upper side in the longitudinal direction, and the end face 30*b* of the source line 30 on the lower side in the longitudinal direction is positioned on the upper side in the longitudinal direction than the end face 44*b* of the semiconductor layer 44 on the lower side in the longitudinal direction. That is, all of the source line 30 is placed on the semiconductor layer 44.

Also with such a structure, a set of the source line 30 and the semiconductor layer 44 forms the protruding section 34. Moreover, at this protruding section 34, the distance A2 between the end faces 44*b* and 30*b* is greater than the distance A1 between the end faces 44*a* and 30*a*. Accordingly, a protruding section where the inclination of the inclined end face 90*b* on the lower side in the longitudinal direction is gentler than the inclination of the inclined end face 90*a* on the upper side in the longitudinal direction is formed on the surface of the alignment film 90 that is formed on the layer above the source line 30. Additionally, with such a structure, the distance of the stepwise inclination of the protruding section 34, along the longitudinal direction D1, on the upper side in the longitudinal direction coincides with the distance A1, and the distance of the stepwise inclination of the protruding section 34, along the longitudinal direction D1, on the lower side in the longitudinal direction coincides with the distance A2.

Figure 10:
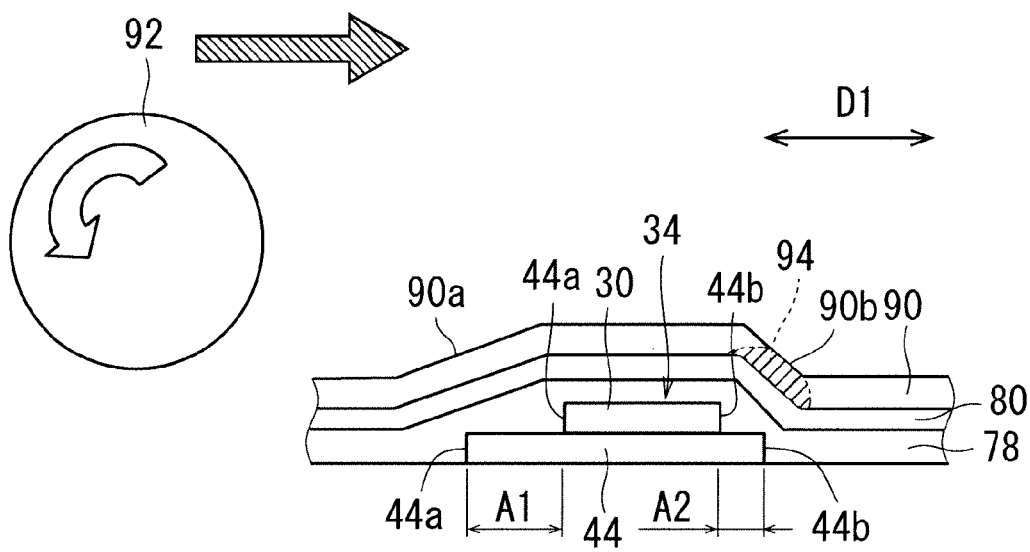
FIG. 10 is a cross-sectional view conceptually illustrating an example of a part of the array substrate according to the comparative example.

Thus, compared to FIG. 10, the reduction in the pressure of the rubbing roller 92 at the inclined end face 90*b* may be suppressed. Then, the portion 94 is made narrower, and all of the portion 94 will face the semiconductor layer 44. Additionally, FIG. 10 is a cross-sectional view schematically illustrating the structure of the array substrate 1 where the long/short relationship of the distances A1 and A2 in FIG. 9 is reversed.

Furthermore, also with the structure in FIG. 9, the light may be blocked at the portion 94 by the semiconductor layer 44. Thus, reduction in the display performance may be avoided.

Additionally, in FIGS. 5 and 9, pairs of the source line 30 and the semiconductor layer 44 form the protruding sections 34 having a substantially pyramid shape with two stages, but the shapes of the end faces are different. Specifically, the end face 34*a* of the upper stage of the protruding section 34 in FIG. 5 is inclined more gently than the end face (end face 30*a*) of the upper stage of the protruding section 34 in FIG. 9. However, the interlayer insulating film 78 and the common electrode 80 are provided on the source line 30 and the semiconductor layer 44. Thus, the difference in the shapes of the end faces do not greatly affect the shape of the alignment film 90, and the shapes of the protruding sections of the alignment films 90 in the examples in FIGS. 5 and 9 are substantially the same. Thus, the effect of the present embodiment may be achieved to about the same degree in both cases.

Figure 11:
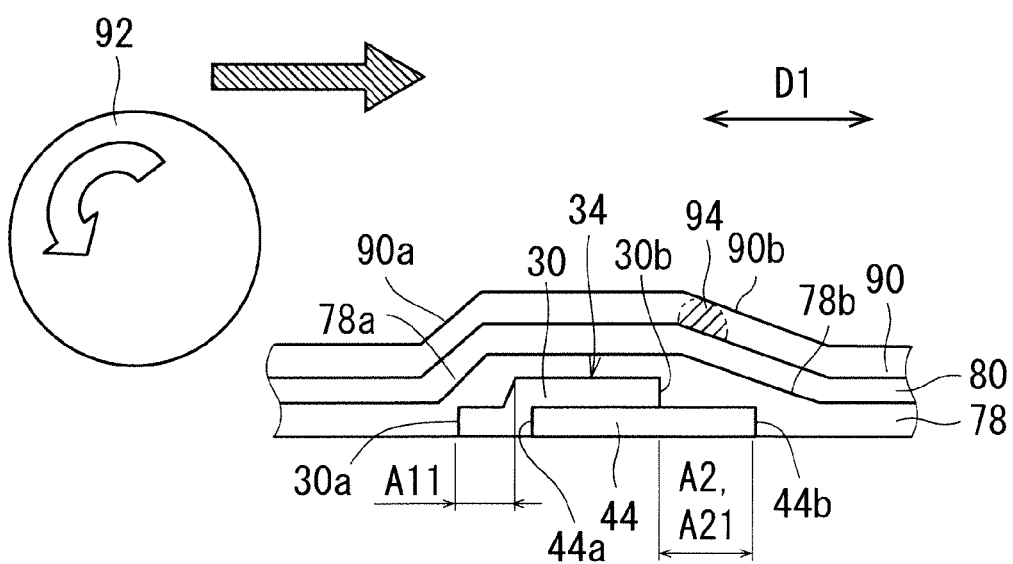
FIG. 11 is a cross-sectional view conceptually illustrating another example of a part of the array substrate.

In the example illustrated in FIG. 11, the source line 30 covers only a portion on the upper side of the semiconductor layer 44 in the longitudinal direction. More specifically, the end face 30*a* on the upper side of the source line 30 in the longitudinal direction and the end face 30*b* on the lower side in the longitudinal direction are positioned on the upper side, in the longitudinal direction, of the end face 44*a* on the upper side of the semiconductor layer 44 in the longitudinal direction and the end face 44*b* on the lower side in the longitudinal direction, respectively.

Also in this case, as with the example described above, a pair of the source line 30 and the semiconductor layer 44 forms the protruding section 34 having a substantially pyramid shape with two stages. Also with this protruding section 34, the distance A21 (=the distance A2) of the stepwise inclination on the lower side in the longitudinal direction is greater than the distance A11 of the stepwise inclination on the upper side in the longitudinal direction. Accordingly, such a set of the source line 30 and the semiconductor layer 44 may also form, to the alignment film 90, a protruding section where the inclination of the inclined end face 90*b* on the lower side in the longitudinal direction is gentler than the inclination of the inclined end face 90*a* on the upper side in the longitudinal direction. Also, the light at the portion 94 may be blocked by the semiconductor layer 44.

Also, in the example described above, the semiconductor layer 44 which is on the same layer as the semiconductor film 40 of the switching element S1 is provided as a structure that is arranged immediately below the source line 30. Then, the semiconductor layer 44 may be formed by using the semiconductor layer for forming the semiconductor film 40 and the ohmic contact layers 41 and 43 of the switching element S1. Accordingly, the number of masks and the necessary steps may be reduced, and the manufacturing cost may be reduced. However, it is also possible to provide another arbitrary structure instead of the semiconductor layer 44. For example, an insulating film or a metal film may be provided. In the following, a protruding section formation aiding section is sometimes adopted as an expression including these structures.

Moreover, this protruding section formation aiding section does not have to be provided below the source line 30, and may be provided above the source line 30. Alternatively, the protruding section formation aiding section may be provided to both below and above the source line 30. For example, the protruding section formation aiding section may be adjacent to the source line 30 in the normal direction of the substrate 10. The protruding section formation aiding section may form the protruding section 34 Integrated with the adjacent source line 30. The protruding section 34 has a substantially pyramid shape and presents the inclinations having the size relationship described above.

Also, in the example described above, a set of the source line 30 and the protruding section formation aiding section forms the protruding section 34 having a substantially pyramid shape with two stages, but a protruding section having a substantially pyramid shape with three or more stages may alternatively be formed.

Furthermore, instead of facing the source line 30 in the normal direction, the protruding section formation aiding section may be adjacent, in plan view, to the source line 30 in the longitudinal direction D1. In this case, of the protruding section formation aiding section and the source line 30, the thickness (thickness in the normal direction) of the one positioned on the lower side in the longitudinal direction is made thinner than the thickness of the one positioned on the upper side in the longitudinal direction. Then, the source line 30 and the protruding section formation aiding section may together form the protruding section 34 that has a substantially pyramid shape and that presents the inclinations having the size relationship described above.

<Margin>

Figure 12:
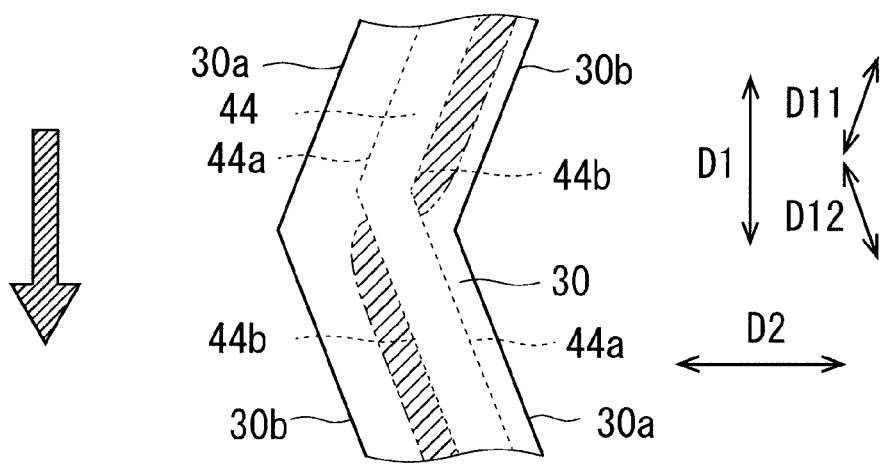
FIG. 12 is a plan view conceptually illustrating an example of a part of the array substrate.

The specific examples (8.5 (μm), 13.5 (μm)) of the distances A1 and A2 described above are design values, for example, and the actual values may be different due to manufacturing tolerance. For example, in the example illustrated in FIG. 12, the semiconductor layer 44 is formed being shifted to the right with respect to the source line 30 by more than the design value compared to FIG. 6. In this case, on the lower side, on the page, than the bent portion, the end face 44a is closer to the end face 30a, and the end face 44b is farther away from the end face 30b. Thus, the distance A1 is reduced, and the distance A2 is increased. Accordingly, the long/short relationship between the distances A1 and A2 is maintained. On the other hand, on the upper side, on the page, than the bent portion, the end face 44a is farther away from the end face 30a, and the end face 44b is closer to the end face 30b, and the distance A1 is increased, and the distance A2 is reduced. Thus, the long/short relationship between the distances A1 and A2 may change. Accordingly, manufacturing tolerance is desirably set in such a way that the long/short relationship between the distances A1 and A2 is not changed. For example, if ±2.5 (μm) is adopted as the manufacturing tolerance, the distance A2 is greater than the distance A1 at all times.

<Protruding Section of Alignment Film>

In the example described above, a set of the source line 30 and the protruding section formation aiding section (for example, the semiconductor layer 44) forms the protruding section 34 described above to thereby form a desired protruding section on the alignment film 90 on the upper layer. However, even if the protruding section formation aiding section is not provided, a protruding section along the source line 30 is formed to the surface of the alignment film 90 due to the source line 30. As can be understood from the description above, it is enough if, in the cross-section that is perpendicular to the transverse direction D2 and passes through the source line 30, the inclination of the inclined end face on the lower side of the protruding section of the alignment film 90 in the longitudinal direction is gentler than the inclination of the inclined end face on the other side. Accordingly, the shape of the protruding section of the alignment film 90 does not necessarily have to be controlled by the shape of the layer below. For example, the protruding section described above may be formed to the alignment film 90 by stacking the alignment film 90 before the rubbing process and then performing etching to adjust the inclined end faces of the protruding section of the alignment film 90 before the rubbing process.

However, as in the present embodiment, if the protruding section described above is formed to the alignment film 90 by using the protruding section formation aiding section, the process of changing the inclinations of the protruding section of the alignment film 90 after the alignment film 90 is stacked does not have to be performed. The process of changing the inclination angle of an inclined end face is complicated, but by using the protruding section formation aiding section, the manufacturing step may be simplified. Thus, the manufacturing cost may be reduced. Moreover, as described above, the portion 94 may be blocked from the light from the backlight by the protruding section 34 (the source line 30).

<Manufacturing Procedure>

Next, the manufacturing procedure for the parts that are characteristic to the present first embodiment will be described. First, a first step of providing the source line 30 that extends in the longitudinal direction D1 while meandering along the main surface of the substrate 10, and a second step are performed. The second step provides the protruding section formation aiding section (for example, the semiconductor layer 44, an insulating film, a metal film or the like) which forms the protruding section 34 together with the source line 30. The protruding section formation aiding section is adjacent to the source line 30 at least in the normal direction of the substrate and that extends along the source line 30 in plan view. The protruding section 34 has a width along the longitudinal direction D1 narrowed in a stepwise manner in a cross-section that passes through the source line 30 and that is perpendicular to the transverse direction D2. The order of the first step and the second step is determined according to which of the source line and the protruding section formation aiding section is provided on the upper layer. Also, the source line 30 and the protruding section formation aiding section are provided in such a way that the distance A21 of the stepwise inclination on the lower side of the protruding section 34 in the longitudinal direction is greater than the distance A11 of the stepwise inclination on the upper side of the protruding section 34 in the longitudinal direction.

Then, the interlayer insulating film 78 and the pixel electrode 70 are provided above the source line 30 and the protruding section formation aiding section. Next, the alignment film 90 before the rubbing process is provided on a layer above the source line 30 and the protruding section formation aiding section (more specifically, above the pixel electrode 70). Then, the rubbing roller 92 is moved from the upper side in the longitudinal direction to the lower side in the longitudinal direction so that the rubbing process is performed on the alignment film 90 before the rubbing process.

Second Embodiment

Figure 13:
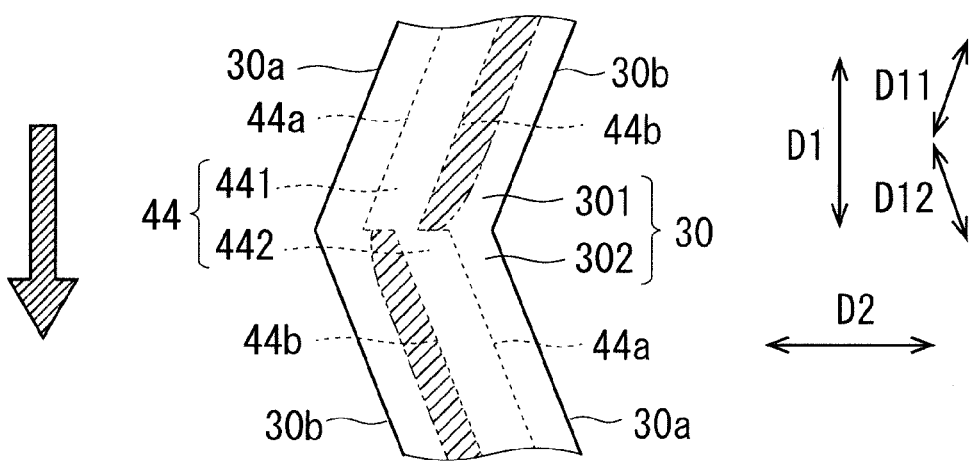
FIGS. 13 to 15 are plan views each conceptually illustrating another example of a part of the array substrate.

FIG. 13 is a plan view illustrating an example of conceptual structures of the source line 30 and the protruding section formation aiding section (hereinafter "semiconductor layer 44") according to a second embodiment. FIG. 13 illustrates the bent portion of the source line 30 and its periphery. With respect to the semiconductor layer 44 in FIG. 13, the portion 441 on the upper side of the bent portion in the longitudinal direction and the portion 442 on the lower side of the bent portion in the longitudinal direction are joined at the joining portion while being relatively shifted along the transverse direction D2. More specifically, the portion 441 protrudes more to the left than the portion 442 at the joining portion, and the portion 442 protrudes more to the right than the portion 441 at the joining portion. Accordingly, the width along the transverse direction D2 of the joining portion of the portions 441 and 442 is narrower than the width of other portions.

Also, the joining portion (bent portion) of the portions 441 and 442 are provided at substantially the same position as the bent portion of the source line 30 in the longitudinal direction D1.

On the other hand, with respect to the source line 30, the portion 301 on the upper side of the bent portion in the longitudinal direction and the portion 302 on the lower side of the bent portion in the longitudinal direction are joined at the joining portion without being relatively shifted along the transverse direction D2. That is, the portions 301 and 302 are joined with each other with the same width.

Also, the portions 301 and 441 extend along the same first inclination direction D11, and the portions 302 and 442 extend along the same second inclination direction D12.

Also with such a structure, the portion 441 is arranged more on the left side with respect to the portion 301, and the portion 442 is arranged more on the right side with respect to the portion 302. Accordingly, as in the first embodiment, the distance A2 (the distance A21) is greater than the distance A1 (the distance A11) regardless of whether the position is on the upper side of the bent portion in the longitudinal direction or on the lower side in the longitudinal direction, and a protruding section where the inclined end face 90b on the lower side in the longitudinal direction is gentle compared to the inclined end face 90a on the upper side in the longitudinal direction may be formed to the alignment film 90.

Furthermore, in the example illustrated in FIG. 13, there is no shifting in the transverse direction D2 at the bent portion of the source line 30. Thus, the width is not reduced due to shifting in the transverse direction D2. Accordingly, the width of the source line 30 at the bent portion may be made equal to or more than the width of other portions.

Disconnection at the bent portion of the source line 30 may then be suppressed. Moreover, an increase in the resistance value at the bent portion of the source line 30 may be avoided.

Figure 14:
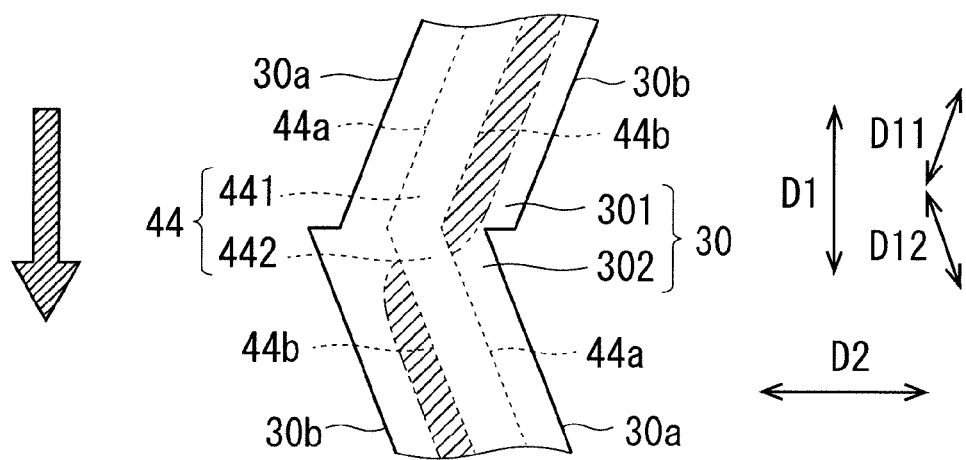

FIG. 14 is a plan view illustrating an example of conceptual structures of the source line 30 and the semiconductor layer 44. In the example illustrated in FIG. 13, the semiconductor layer 44 forms a shift in the transverse direction D2 at the bent portion, but in the example illustrated in FIG. 14, the source line 30 forms a shift in the transverse direction D2 at the bent portion. That is, the portions 301 and 302 are joined at the joining portion while being relatively shifted along the transverse direction D2. More specifically, the portion 301 is joined at the joining portion while being shifted to the right with respect to the portion 302.

On the other hand, the semiconductor layer 44 does not form a shift in the transverse direction D2 at the bent portion. That is, the portions 441 and 442 are joined with the same width without forming a relative shift in the transverse direction D2.

Also with the structure in FIG. 14, the portion 441 is arranged more on the left side with respect to the portion 301, and the portion 442 is arranged more on the right side with respect to the portion 302. Accordingly, as in the first embodiment, the distance A2 (the distance A21) is greater than the distance A1 (the distance A11) regardless of whether the position is on the upper side of the bent portion in the longitudinal direction or on the lower side in the longitudinal direction, and a protruding section where the inclined end face 90b on the lower side in the longitudinal direction is gentle compared to the inclined end face 90a on the upper side in the longitudinal direction may be formed to the alignment film 90.

Moreover, the semiconductor layer 44 does not form a shift in the transverse direction D2 at the bent portion. Accordingly, the width at the bent portion is not reduced due to the shift in the transverse direction D2. Thus, the width of the semiconductor layer 44 at the bent portion may be made equal to or more than the width of other portions. Disconnection at the bent portion of the semiconductor layer 44 may then be suppressed.

Figure 15:
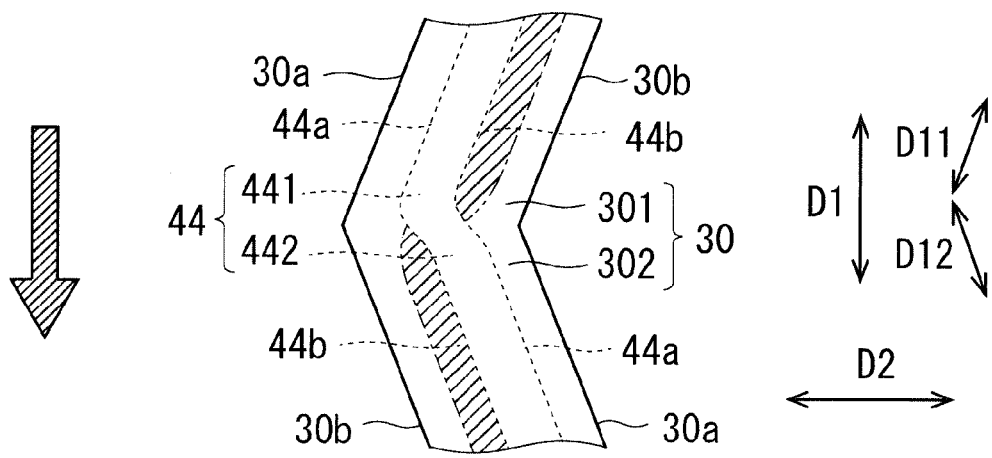

FIG. 15 is a plan view illustrating an example of conceptual structures of the source line 30 and the semiconductor layer 44. In the example illustrated in FIG. 15, the source line 30 has the same shape as the source line 30 in FIG. 13. Moreover, also in the example illustrated in FIG. 15, the portion 441 is arranged more on the left side with respect to the portion 301, and the portion 442 is arranged more on the right side with respect to the portion 302. Accordingly, as in the first embodiment, the distance A2 (the distance A21) is greater than the distance A1 (the distance A11) regardless of whether the position is on the upper side of the bent portion in the longitudinal direction or on the lower side in the longitudinal direction, and a protruding section where the inclined end face 90b on the lower side in the longitudinal direction is gentle compared to the inclined end face 90a on the upper side in the longitudinal direction may be formed to the alignment film 90.

Moreover, in the example illustrated in FIG. 15, the portions 441 and 442 of the semiconductor layer 44 are smoothly joined at the bent portion. In the example illustrated in FIG. 15, the semiconductor layer 44 extends with substantially the same width even at the bent portion. Accordingly, unlike in FIGS. 13 and 14, the line width of the semiconductor layer 44 is not locally narrowed, and inconveniences such as disconnection at the time of manufacturing may be reduced. Also, since an acute angle is not formed, stress concentration may be avoided.

Additionally, each of the source line 30 and the semiconductor layer 44 may be smoothly extended at the bent portion thereof also in examples other than that illustrated in FIG. 15 (for example, FIG. 5). The stress concentration may then be avoided.

While the invention has been shown and described in detail, the foregoing description is in all aspects illustrative and not restrictive. It is therefore understood that numerous modifications and variations can be devised without departing from the scope of the invention.

What is claimed is:

1. An array substrate for a liquid crystal display device, sandwiching a liquid crystal with an opposite substrate, the array substrate comprising:
   a substrate;
   a first line that is provided on a layer above said substrate, and that extends, as a whole, in a first direction while meandering along a main surface of said substrate; and
   an alignment film that is provided on a layer above said first line, and that specifies an alignment direction of said liquid crystal, a surface of said alignment film including a first protruding section protruding in a normal direction of said main surface, said first protruding section meandering and extending along said first line, said first protruding section appearing as a plurality of first cross-sectional protruding sections in a cross-section that passes through said first line, that is parallel to said first direction and that is perpendicular to said substrate, each of said plurality of first cross-sectional protruding sections including a first end face on one side in said first direction and a second end face on another side, an inclination of said first end face being steeper than an inclination of said second end face.

2. The array substrate for a liquid crystal display device according to claim 1, further comprising:
   a protruding section formation aiding section that is adjacent to said first line in said normal direction, and that extends along said first line in plan view,
   wherein a set of said protruding section formation aiding section and said first line includes, in said cross-section, a second protruding section whose width along said first direction is reduced in a stepwise manner as a distance from said substrate is increased,
   a distance of a stepwise inclination, of said second protruding section, on said one side along said first direction is shorter than a distance of a stepwise inclination of said second protruding section, on said other side along said first direction, and
   said first protruding section protrudes by reflecting a shape of said second protruding section.

3. The array substrate for a liquid crystal display device according to claim 2, wherein
   said first line and said protruding section formation aiding section have different widths along said first direction and extend with a same pattern, and
   among said first line and said protruding section formation aiding section, one with a narrower width along said first direction is formed being shifted more to said one side in said first direction than one with a wider width along said first direction.

4. The array substrate for a liquid crystal display device according to claim 2, wherein said first line or said protruding section formation aiding section extends smoothly along said main surface at a bent portion of its meander.

5. The array substrate for a liquid crystal display device according to claim 2, wherein
   said protruding section formation aiding section includes a first portion and a second portion alternately in said first direction,
   both said first portion and said second portion are parallel to said main surface,
   said first portion and said second portion extend, respectively, along a first inclination direction and a second inclination direction that are inclined to opposite sides from each other with respect to said first direction, and
   said first portion and said second portion are joined being shifted from each other in a second direction that is parallel to said substrate and that is perpendicular to said first direction.

6. The array substrate for a liquid crystal display device according to claim 2, wherein
   said first line includes a third portion and a fourth portion alternately in said first direction,
   both said third portion and said fourth portion are parallel to said main surface,
   said third portion and said fourth portion extend, respectively, along a first inclination direction and a second inclination direction that are inclined to opposite sides from each other with respect to said first direction, and
   said third portion and said fourth portion are joined being shifted from each other in a second direction that is parallel to said substrate and that is perpendicular to said first direction.

7. The array substrate for a liquid crystal display device according to claim 2, further comprising:
   a second line that extends while intersecting said first line via an insulating film; and
   a transistor formed at an intersection of said first line and said second line,
   wherein said protruding section formation aiding section includes a semiconductor layer of a same composition as a semiconductor film of said transistor.

8. The array substrate for a liquid crystal display device according to claim 1, wherein a width of a bent portion of said first line along a direction perpendicular to said first direction and said normal direction is equal to or greater than a width of another portion of said first line.

9. A manufacturing method of an array substrate for a liquid crystal display device, sandwiching a liquid crystal with an opposite substrate, the method comprising the steps of:
   providing a first line that extends in a first direction while meandering along a main surface of a substrate;
   providing a protruding section formation aiding section that forms a first protruding section together with said first line, said protruding section formation aiding section being adjacent to said first line in a normal direction of said substrate, and meandering and extending along said first line in plan view, said first protruding section including a width along said first direction being narrowed in a stepwise manner as a distance from said substrate is increased in a cross-section that passes through said first line and is parallel to said first direction and is perpendicular to said substrate, said first protruding section appearing as a plurality of first cross-sectional protruding sections in said cross-section, a distance of a stepwise inclination on one side in said first direction being greater than a distance of a stepwise inclination on another side in said first direction for each of said plurality of first cross-sectional protruding sections;

providing an alignment film before rubbing process on a layer above said first line and said protruding section formation aiding section; and performing rubbing process on said alignment film before rubbing process by moving a rubbing roller from said other side in said first direction to said one side.

* * * * *